(12) United States Patent
Hydro (10) Patent No.: US 11,673,590 B2
(45) Date of Patent: Jun. 13, 2023

(54) INSPECTION SYSTEM FOR AMUSEMENT RIDES HAVING TRACKS

(71) Applicant: Robert Hydro, Jim Thorpe, PA (US)

(72) Inventor: Robert Hydro, Jim Thorpe, PA (US)

( * ) Notice: Subject to any disclaimer, the term of this patent is extended or adjusted under 35 U.S.C. 154(b) by 130 days.

(21) Appl. No.: 17/385,780

(22) Filed: Jul. 26, 2021

(65) Prior Publication Data

US 2021/0354739 A1 Nov. 18, 2021

Related U.S. Application Data

(63) Continuation of application No. 15/680,189, filed on Aug. 17, 2017, now abandoned.

(51) Int. Cl.
| | |
|---|---|
| *B61K 9/10* | (2006.01) |
| *B61L 27/50* | (2022.01) |
| *B61L 23/04* | (2006.01) |
| *B61L 23/14* | (2006.01) |
| *A63G 7/00* | (2006.01) |
| *H04N 7/18* | (2006.01) |
| *B61B 5/02* | (2006.01) |
| *A63G 21/04* | (2006.01) |
| *B61L 27/53* | (2022.01) |
| *H04N 23/54* | (2023.01) |
| *H04N 23/57* | (2023.01) |
| *H04N 23/69* | (2023.01) |
| *H04N 23/90* | (2023.01) |

(52) U.S. Cl.
CPC ............ *B61L 27/50* (2022.01); *A63G 7/00* (2013.01); *A63G 21/04* (2013.01); *B61B 5/02* (2013.01); *B61K 9/10* (2013.01); *B61L 23/044* (2013.01); *B61L 23/045* (2013.01); *B61L 23/14* (2013.01); *B61L 27/53* (2022.01); *H04N 7/181* (2013.01); *H04N 23/54* (2023.01); *H04N 23/57* (2023.01); *H04N 23/69* (2023.01); *B61L 2201/00* (2013.01); *H04N 23/90* (2023.01)

(58) Field of Classification Search
CPC .... B61L 2201/00; B61L 23/044; B61L 23/14; B61L 23/54; B61L 23/69; H04N 23/54; H04N 23/69; H04N 7/181; B61K 9/10
See application file for complete search history.

(56) References Cited

U.S. PATENT DOCUMENTS

| | | | |
|---|---|---|---|
| 3,953,714 A | * | 4/1976 | Gabillard ................ B61L 3/121 246/187 B |
| 5,623,244 A | | 4/1997 | Cooper |
| 6,064,428 A | | 5/2000 | Trosino et al. |
| 6,349,653 B1 | | 2/2002 | Siedlarczyk |

(Continued)

FOREIGN PATENT DOCUMENTS

| | | |
|---|---|---|
| EP | 1 236 634 A1 | 9/2002 |
| GB | 2 305 796 | 4/1997 |

*Primary Examiner* — Scott A Browne
(74) *Attorney, Agent, or Firm* — LaMorte & Associates P.C.

(57) ABSTRACT

An inspection system for inspecting the track of an amusement ride with at least one rail. A vehicle is provided that is designed to ride along the track. The vehicle supports cameras. The cameras are positioned in unobstructed areas. The cameras image the rail from different angles as the vehicle rides along the track. The images recorded by the cameras are reviewed to identify any defect or issue with the rail or its supporting framework that may impact from the safety of the ride.

7 Claims, 8 Drawing Sheets

(56) References Cited

U.S. PATENT DOCUMENTS

| | | | |
|---|---|---|---|
| 6,434,510 B1* | 8/2002 | Callaghan | G01C 22/02 |
| | | | 702/116 |
| 6,992,695 B1 | 1/2006 | Simpson et al. | |
| 7,412,312 B2* | 8/2008 | Leblanc | G01L 5/284 |
| | | | 340/447 |
| 7,659,972 B2 | 2/2010 | Magnus et al. | |
| 7,743,710 B2 | 6/2010 | Gordon | |
| 8,453,577 B2 | 6/2013 | Gordon | |
| 9,022,198 B2 | 5/2015 | Lykkegaard et al. | |
| 2007/0031217 A1 | 2/2007 | Sharma | |
| 2007/0227274 A1 | 10/2007 | Verl et al. | |
| 2010/0078991 A1 | 4/2010 | Maischak et al. | |
| 2014/0125356 A1 | 5/2014 | Cooper et al. | |

\* cited by examiner

INSPECTION SYSTEM FOR AMUSEMENT RIDES HAVING TRACKS

BACKGROUND OF THE INVENTION

1. Field of the Invention

In general, the present invention relates to inspection systems for inspecting metal tracks with a camera system. More particularly, the present invention relates to inspection systems for roller coasters and other amusement park rides that run on tracks.

2. Prior Art Description

Many amusement parts contain rides with some form of vehicle that rides along a track. The most iconic of such rides is the roller coaster. The tracks of a roller coaster may extend hundreds of yards from start to finish. Between the start and finish, the tracks may be formed into a variety of drops, turns, twists and loops. As cars ride along the tracks, the rails of the tracks and the support framework for the rails experience large dynamic forces. Furthermore, the rails and the support framework of the roller coaster experience deformation due to changes in temperature and degradation due to both friction and weather. All of these variables can cause the tracks of a ride, such as a roller coaster, to become unsafe.

To ensure that the tracks of an amusement park ride are safe, various local, state, and federal regulations require that the track be inspected. Typically, the tracks are inspected every day before the ride is permitted to open. Inspecting the tracks of an amusement ride can be very difficult. If the tracks are part of a large roller coaster, it may take hours to travel the full length of the tracks. Much of the time and labor used during the inspection is caused by inspectors climbing the framework to reach the remote areas of tracks.

In the prior art, there have been inspection systems for tracks that are intended to reduce the time and labor needed for rail inspections. Railroads have inspection systems that image the tracks of a railroad as a train travels along the tracks. Such prior art systems are exemplified by European Patent Application No. EP 1,236,634 to Ingham. Although such systems are useful for railroads, they cannot be adapted for use on amusement rides, such as roller coasters. This is primarily because on a railroad, only the top of the rail needs to be inspected for cracks and wear. On a roller coaster, an inspection must be done around the entire perimeter of the rail and must include the mounts to the support framework holding the tracks and the support framework itself.

U.S. Pat. No. 7,743,710 to Gordon and U.S. Pat. No. 8,453,577 to Gordon both disclose inspection vehicles for a roller coaster that use auxiliary carts. The carts carry a worker and tools along the track. Such prior art systems are useful in repairing a section of track with a low slope. However, such systems cannot be used to inspect steep drops, loops and corkscrew twists. Furthermore, the speed of the inspection is limited to the observational capacities of the person traveling in the inspection vehicle.

In U.S. Patent Application No. 2007/0227274 to Verl, entitled Testing Device For Tracks Of Roller Coasters, a vehicle is disclosed that travels on flat, or low grade sections of track. The vehicle carries a robot with different tool heads that may be needed to repair the track. The Verl device can place a single camera at the end of the robot arm. However, the camera can only see one side of one rail. Thus, any camera inspection using the Verl system would require multiple passes and would take longer than a manual inspection. Furthermore, the inspection vehicle in the Verl system is only held onto the tracks by gravity. As such, it cannot operate at steep angles or along inverted sections of track, as is required in many modern roller coasters.

A need therefore exists for an inspection system that can be used on roller coasters and other amusement park rides, wherein the rails along the track are rapidly and accurately inspected during a single pass of an inspection vehicle. Furthermore, a need exists for an inspection system that can rapidly inspect the full length of a roller coaster without regard to the grade or configuration of the tracks. These needs are met by the present invention as described and claimed below.

SUMMARY OF THE INVENTION

The present invention is an inspection system for inspecting the tracks of an amusement ride. The amusement ride has a support framework that supports at least one rail. The support framework creates obstructed areas and unobstructed areas that run proximate the rail along the length of the tracks.

A vehicle is provided that is designed to ride along the track. The vehicle supports a plurality of cameras. The cameras are positioned in unobstructed areas. In this manner, the cameras do not inhibit the movement of the vehicle along the tracks. The cameras image the rail from different angles as the vehicle rides along the tracks. The images recorded by the cameras are reviewed to identify any defect or issue with the rail or its supporting framework that may impact from the safety of the ride.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention inspection system can be adapted for use on the tracks of many amusement park rides, the present invention is especially well suited for inspecting the rails of roller coaster tracks. A few exemplary embodiments of the inspection system have been selected for use in illustrations and descriptions. The exemplary embodiments all show the inspection system adapted to inspect the tracks of a roller coaster. The embodiments are selected in order to set forth some of the best modes contemplated for the invention. The illustrated embodiments, however, are merely exemplary and should not be considered limitations when interpreting the scope of the appended claims.

Figure 1:
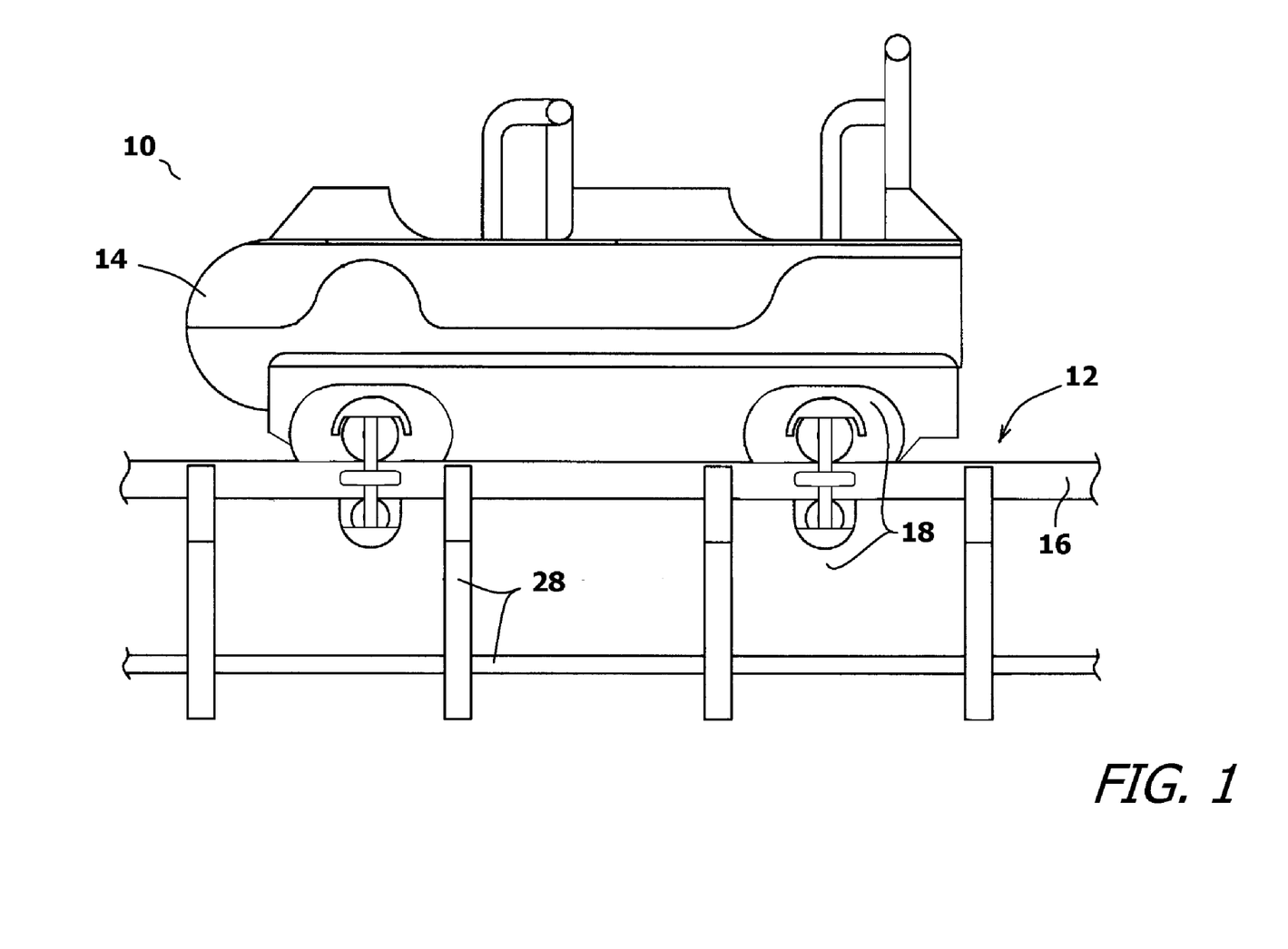
FIG. 1 is a side view of a prior art roller coaster car on a section of track.
Figure 2:
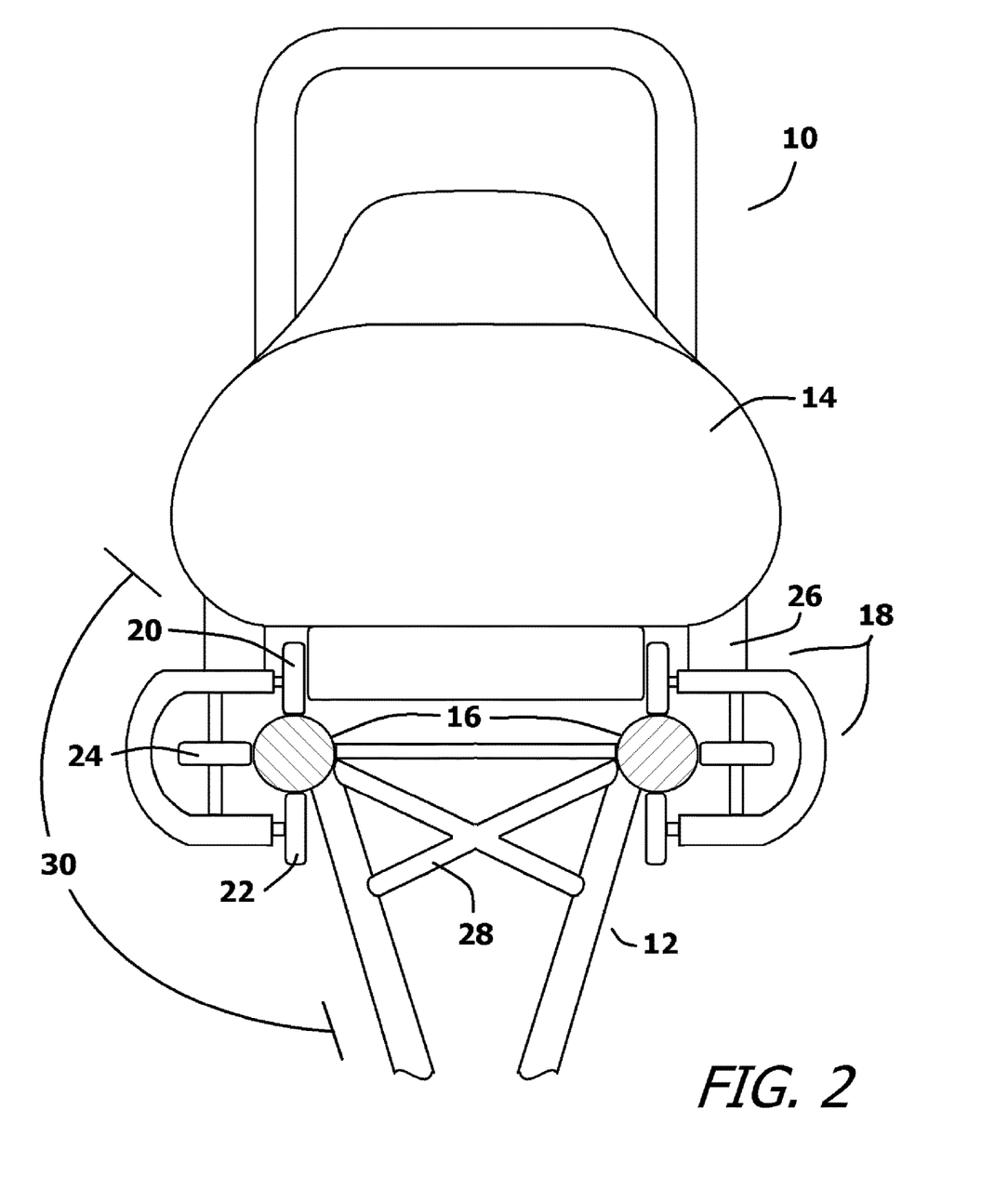
FIG. 2 is a front view of the prior art embodiment of FIG. 1.

Referring to FIG. 1 in conjunction with FIG. 2, a prior art section of track 12 from a roller coaster 10 is shown in conjunction with a roller coaster car 14. It will be understood that the roller coaster car 14 rides upon rails 16. The rails 16 may be round, I-shaped or have some complex shape unique to the roller coaster 10. The rails 16 are parallel and remain evenly spaced along the entire length of the track 12.

The roller coaster car 14 has wheel clusters 18 that support the roller coaster car 14 as it runs along the track 12. The wheel clusters 18 include top wheels 20, bottom wheels 22, and side wheels 24 that all engage different surfaces of the rails 16. The wheel clusters 18 prevent the roller coaster car 14 from derailing from the rails 16 regardless of the orientation of the roller coaster car 14. In this manner, the roller coaster car 14 can travel the track 12 as it moves into loops, and spirals without fear that the roller coaster car 14 will separate from the rails 16.

The wheel clusters 18 are supported by wheel brackets 26 under the roller coaster car 14. The track 12 of the roller coaster 10 includes the rails 16 and the support framework 28 that retains the rails 16 in fixed positions. The wheel clusters 18, wheel brackets 26 and support framework 28 are designed in unison so that the support framework 28 never impedes the free movement of the wheel clusters 18 and the wheel brackets 26 as they travel along the track 12. Accordingly, it will be understood that there exists unimpeded areas 30 around the rails 16 into which the support framework 28 never extends.

Figure 3:
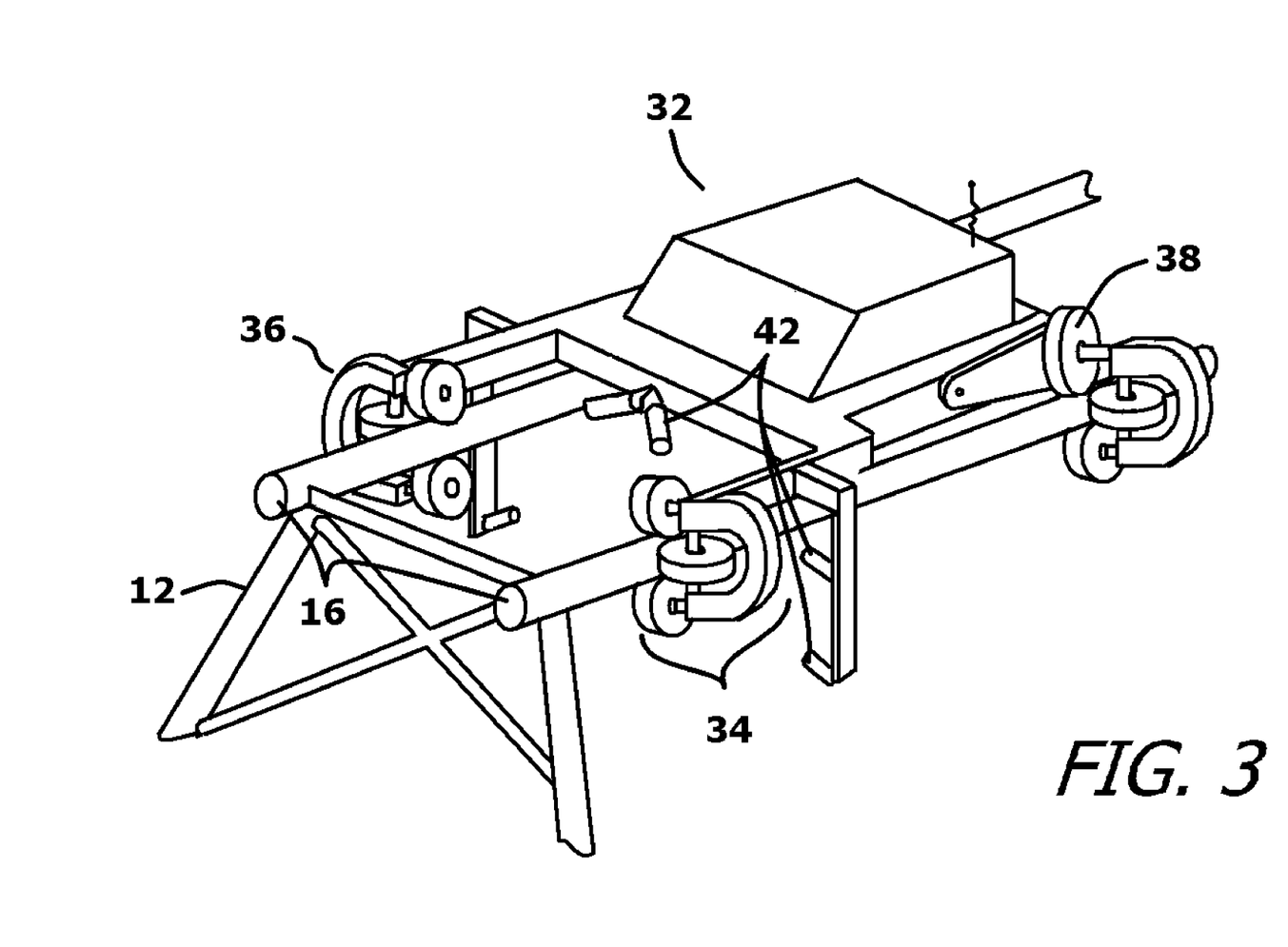
FIG. 3 is a perspective view of an exemplary embodiment of an inspection vehicle engaging a section of track.
Figure 4:
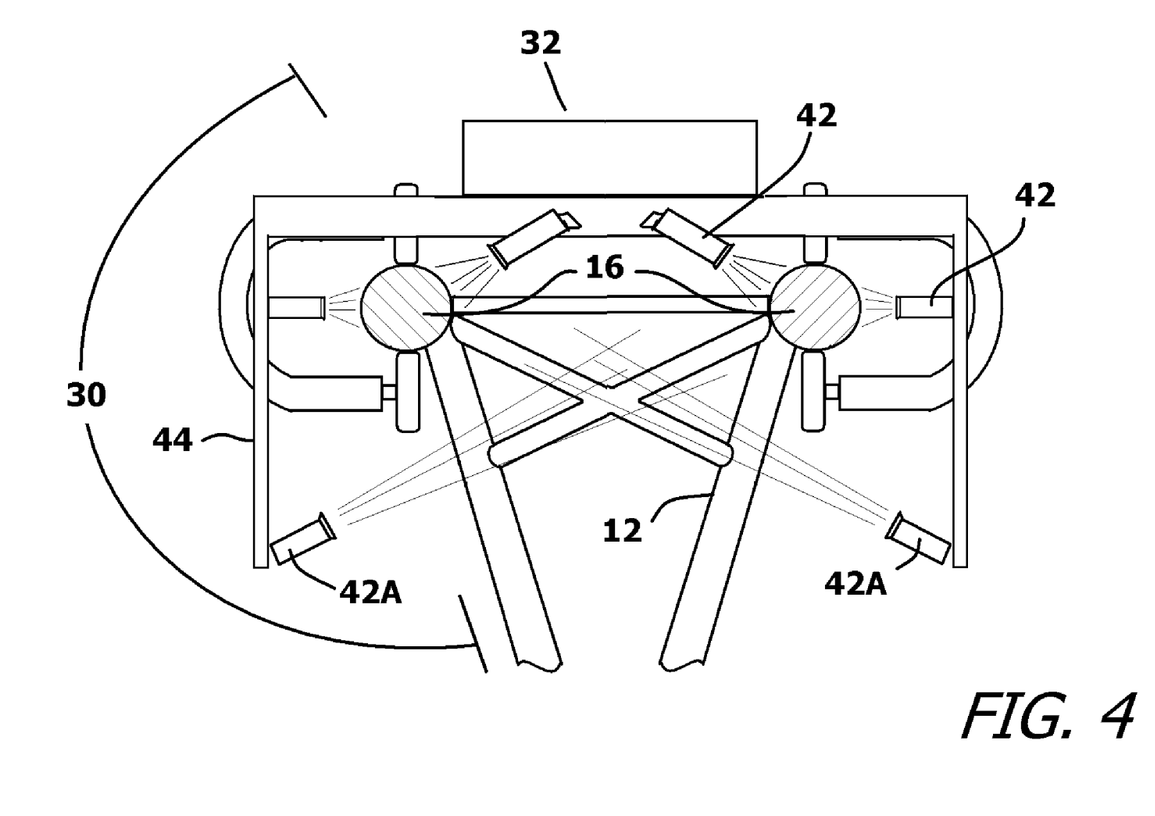
FIG. 4 is a front view of the inspection vehicle shown in FIG. 3.

Referring to FIG. 3 in conjunction with FIG. 4 and FIG. 2, an inspection vehicle 32 is shown. The inspection vehicle 32 has wheel clusters 34 similar in construction to that of the roller coaster car 14 of FIG. 1. The wheel clusters 34 are supported by wheel brackets 36 that are similar in shape, but less robust than those used on the roller coaster car 14. In this manner, once attached to the rails 16 of the roller coater track 12, the inspection vehicle 32 is incapable of derailing as it travels along the length of the track 12. The wheel clusters 34 and the wheel brackets 36 of the inspection vehicle 32 exist in the same unimpeded areas 30 surrounding the rails 16 as do the corresponding parts on the roller coaster car 14.

A difference between the wheel clusters 18 on the roller coaster car 14 and the wheel clusters 34 on the inspection vehicle 32 is that at least one of the wheels on the inspection vehicle 32 is a drive wheel 38 that is coupled to an electric motor 40. Furthermore, the drive wheel 38 is biased against a rail 16 by a spring or similar construct that will maintain friction between the drive wheel 38 and the rail 16 regardless of the orientation of the inspection vehicle 32 relative the rails 16. In this manner, the inspection vehicle 32 can travel through loops and twists while remaining in full contact with the rails 16.

The inspection vehicle 32 holds a plurality of cameras 42. Some of the cameras 42 are directed toward the first rail 16A and some of the cameras 42 are directed toward the second rail 16B. Some of the cameras 42 may also be directed toward areas of the support framework 28 that supports the rails 16. The purpose of the cameras 42 is to image all surfaces of the rails 16 and the support framework 28 so those images can be analyzed for the presence of cracks, rust, obstructions or anything else that may compromise safety. The difficulty is imaging 360 degrees around each of the rails 16 since the unimpeded areas 30 into which a camera 42 can be positioned do not extend 360 degrees around the rails 16. The 360 degree imaging is accomplished by using multiple cameras 42 in the unimpeded areas 30 that are focused onto the rails 16 at opposing angles. In the illustrated example, each of the three of the cameras 42 is focused on different areas of the same rail 16 at the same position along the track 12. The field of view for the three cameras 42 overlap to provide 360 degree imaging of each point along the length of the rail 16. Although each of the three cameras 42 may be a different distance from the rail 16, each camera 42 is focused on the surface of the rail 16.

Imaging the rails 16 under the inspection vehicle 32 is easily accomplished by mounting cameras 42 in the unimpeded areas 30 adjacent to the rail 16. The difficult areas of the rail 16 to image are the sides of the rails 16 opposite where the inspection vehicle 32 rests. This area is typically obstructed by the support framework 28 of the roller coaster 10. To image the underside, at least some of the cameras 42A are mounted on long camera arms 44 that extend down from the inspection vehicle 32 in an unimpeded area 30. The camera 42A on the long camera arm 44 is angled to image the underside of a rail 16. Depending upon the design of the roller coaster 10, the long camera arms 44 may be fixed, or may be retractable, as is explained with reference to FIG. 5.

Figure 5:
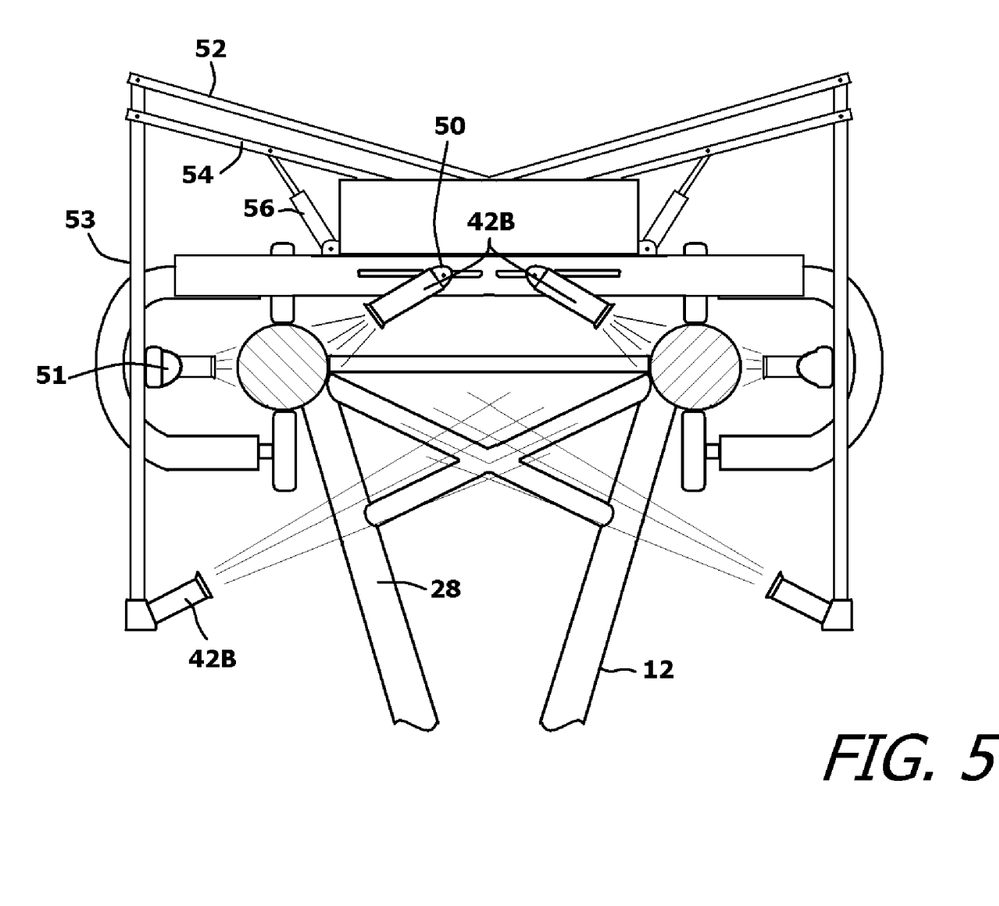
FIG. 5 is an alternate embodiment of the inspection vehicle engaging a section of track.

In FIG. 4, the cameras 42 are fixed in place. In the embodiment of FIG. 5, at least some of the cameras 42B are adjustable and have fields of view that can be selectively directed toward various target areas. Referring to FIG. 5, a variation of the camera system is presented, wherein each of the cameras 42B has an activator that can adjust the field of view. In this embodiment, some of the cameras 42B have linear activators 50 that can alter the position of the camera 42B along slots. Other cameras 42B are attached to articulating gimbals 51 that can alter the orientation of the cameras 42B. In FIG. 5, one of the cameras 42B is attached to a retractable arm assembly 52. The retractable arm assembly 52 has a camera arm 53 that is connected to an articulating linkage 54. The articulating linkage 54 is moved by an actuator 56. The retractable arm assembly 52 enables the camera arm 53 to be selectively retracted and deployed as needed. This feature is useful on roller coasters with periodic obstructions along the track 12 created by various beam supports and brackets in the support framework 28.

Figure 6:
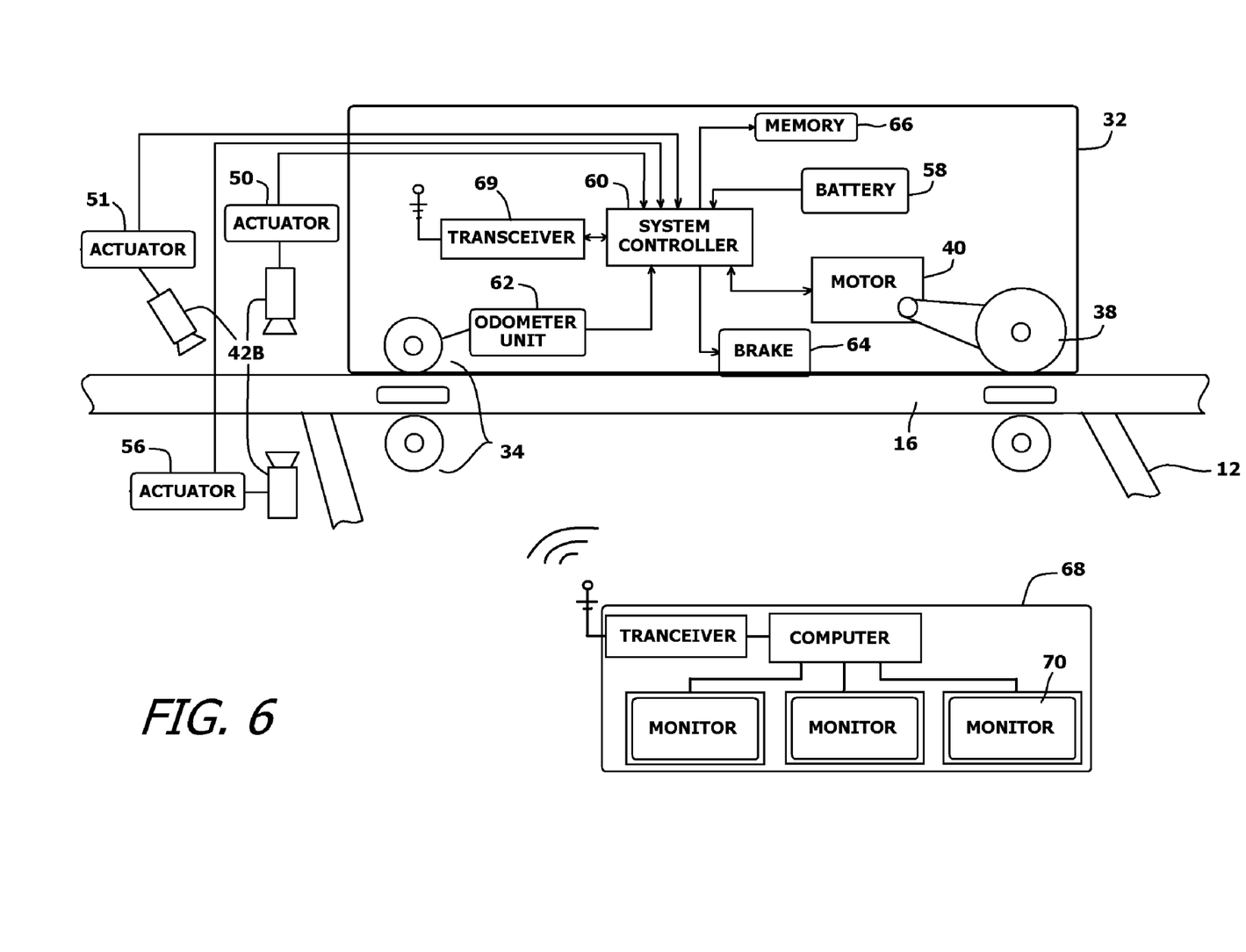
FIG. 6 is a block diagram schematic showing the major components of an exemplary inspection vehicle.

Referring to FIG. 6 in conjunction with FIG. 5 and FIG. 3, the components of the inspection vehicle 32 are described. The inspection vehicle 32 is a vehicle that rides upon wheel clusters 34. The wheel clusters 34 include at least one drive wheel 38. The drive wheel 38 is biased against a rail 16 so that any rotational motion of the drive wheel 38 is translated into motion of the inspection vehicle 32. The drive wheel 38 is driven by an electric motor 40. The electric motor 40 is powered by a rechargeable battery 58 that is operable in any orientation. The electric motor 40 is controlled by a systems controller 60. The systems controller 60 obtains feedback from the electric motor 40 that informs the systems controller 60 precisely how many times the electric motor 40 and the drive wheel 38 have rotated. This information can be utilized by the systems controller 60 to determine the speed and distance traveled by the inspection vehicle 32.

A separate odometer unit 62 is preferably provided that engages the rail 16. The odometer unit 62 can determine exactly how far the drive wheel 38 has driven the inspection vehicle 32. The odometer unit 62 can also determine the travel speed of the inspection vehicle 32. Data from the odometer unit 62 is also provided to the systems controller 60.

A safety brake 64 is provided. The safety brake 64 selectively engages a rail 16 when activated and locks the inspection vehicle 32 into a fixed position along the track 12. The safety brake 64 can be manually operated, but is primarily operated automatically by the systems controller 60. The systems controller 60 receives distance data and speed data from both the electric motor 40 and the odometer unit 62. The systems controller 60 compares the speed data and/or the distance data received from the electric motor 40 and the odometer unit 62. The data should match, within a small margin of error. If the data indicates that the inspection vehicle 32 is traveling over a predetermined maximum speed, then the safety brake 64 will automatically activate. Likewise, if the data from the electric motor 40 concerning speed and/or distance does not match the data from the odometer unit 62, then this is an indication that the electric motor 40, drive wheel 38, and/or odometer unit 62 is malfunctioning. This condition also causes the safety brake 64 to activate. This safety system prevents the inspection vehicle 32 from becoming a runaway projectile along the track 12, should it malfunction on a steep grade.

The systems controller 60 also controls various actuators 50, 51, 56 that manipulate cameras 42B. Movements of the cameras 42B can be preprogrammed to correspond to the position of the inspection vehicle 32 along the track 12. In this manner, if a particular obstacle is known at a particular location along the track 12, the cameras 42B can be manipulated to image around that obstacle.

The cameras 42B send periodic pictures or stream video to the systems controller 60. The systems controller 60 can store this image data in a memory 66 to be downloaded at the end of the inspection run. Alternatively, the systems controller 60 can stream the image data to a remote monitoring system 68 using a transceiver 69. The position data along the track 12 is monitored by the electric motor 40 and/or the odometer unit 62. The data that corresponds to position along the track 12 is superimposed upon the images of the track 12 being recoded by the cameras 42.

Figure 7:
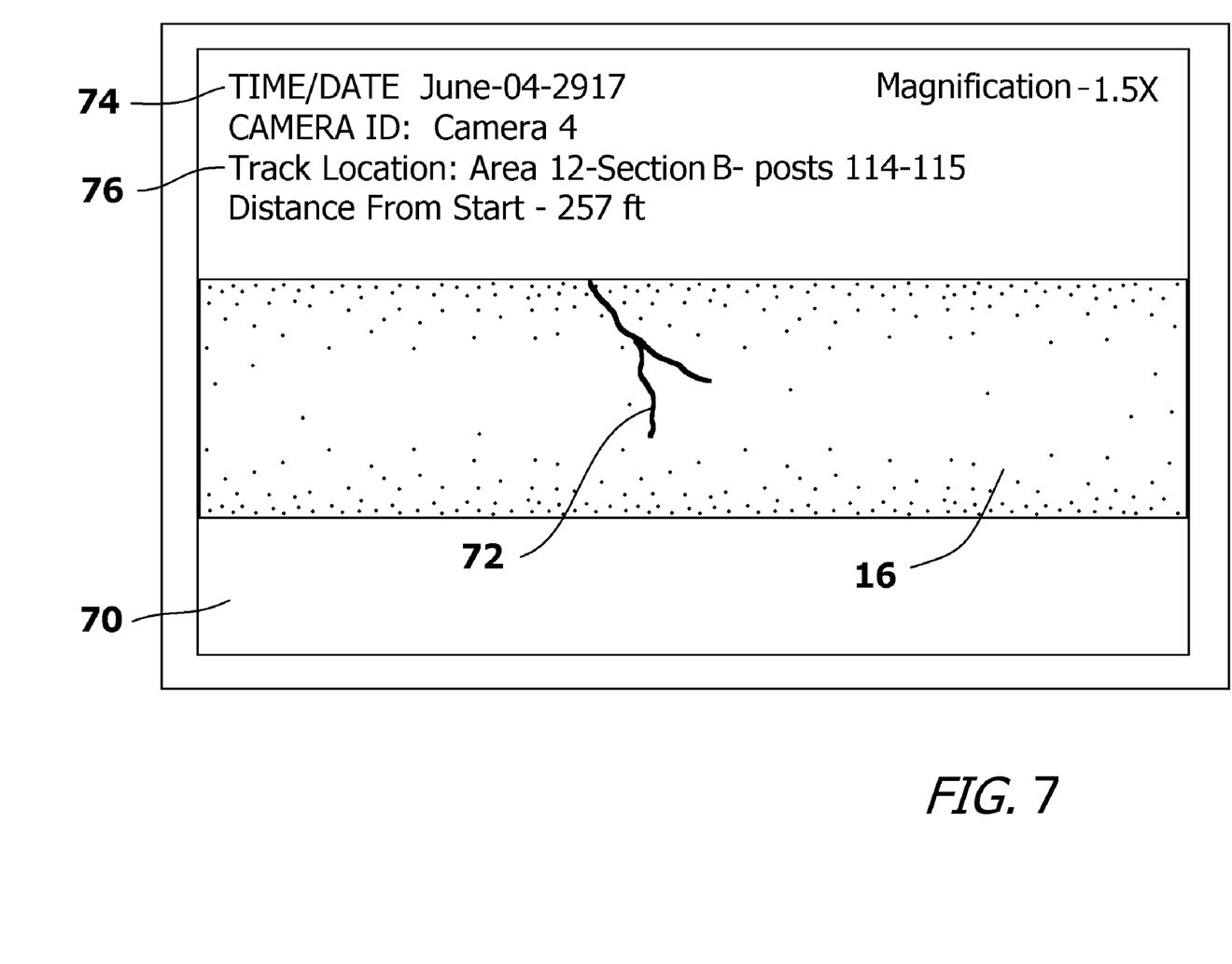
FIG. 7 shows an exemplary monitor image created by an inspection vehicle.

Referring briefly to FIG. 7 in conjunction with FIG. 6, an exemplary image 70 created by the inspection vehicle 32 is shown. The image 70 is that generated by one of the cameras 42B. The image 70 shown happens to identify a crack 72 in the rail 16 under observation. Superimposed over the image 70 is the identity of the camera 42 that is taking the image 70 as well as a date/time stamp 74 and the location stamp 76 for the camera 42B at the time the image 70 was taken. The location stamp 76 identifies where along the track 12 the crack 72 was found. The identity of the camera 42B identifies which rail 16 is being imaged and in what area around the 360 degree circumference of the rail 16 the crack 72 is located. This information can then be forwarded to a serviceman who can climb to the identified location and implement a repair.

Returning to FIG. 6, it will be understood that the inspection vehicle 32 can be preprogrammed to travel the track 12 of a particular roller coaster and store the images of the rails 16 and support framework 28 for later analysis. Alternatively, the inspection vehicle 32 can be used interactively. The systems controller 60 may be connected to a transceiver 69 that enables data to be read to and from the inspection vehicle 32. In this manner, control signals can be read into the systems controller 60 for moving the inspection vehicle 32 and any camera actuators 50, 51, 56. Likewise, images from the cameras 42B can be streamed to remote monitoring stations 68 in real time. The remote monitoring stations 68 can view the monitors in real time to verify that a track 12 is sound before its daily use.

Figure 8:
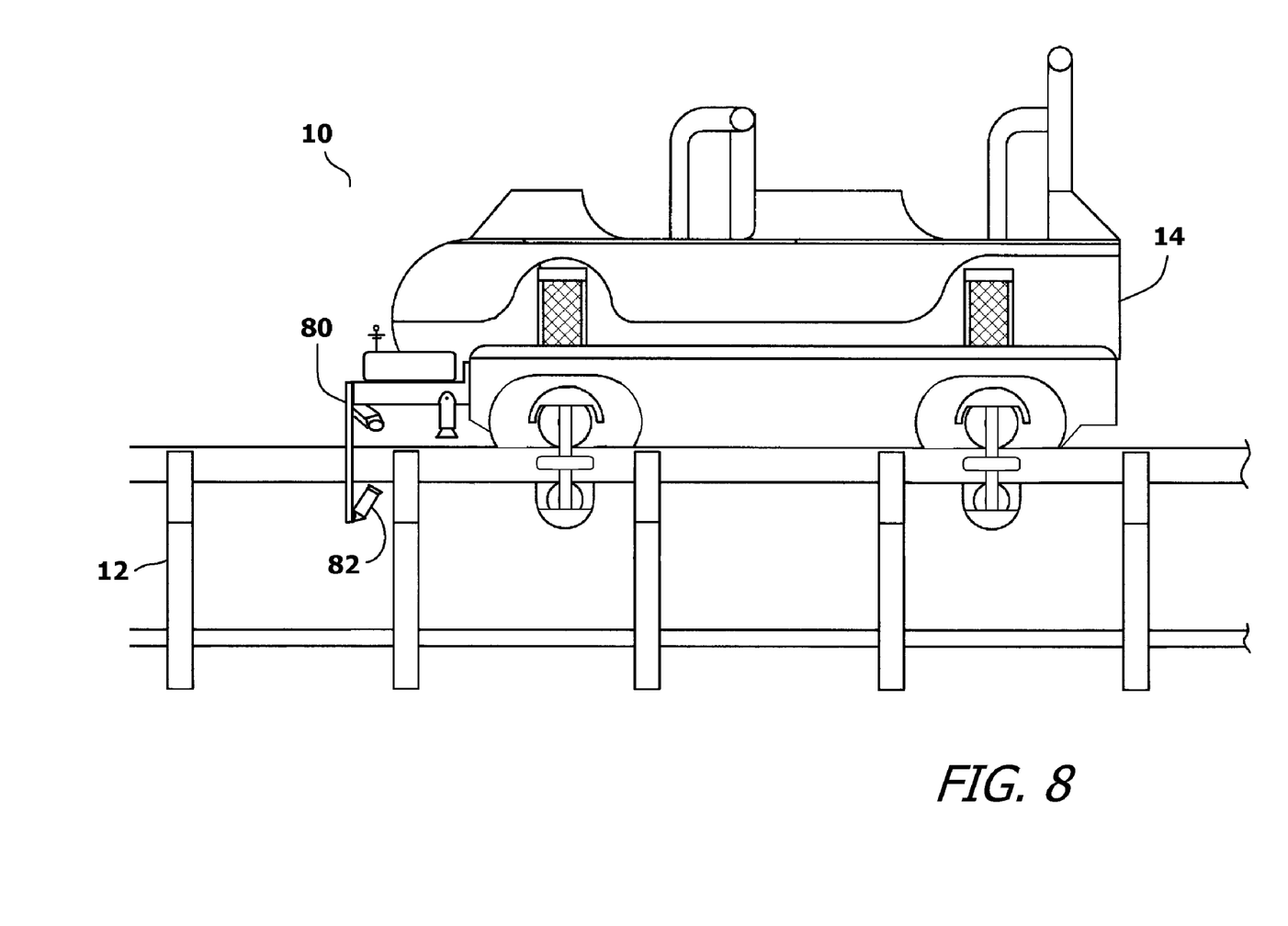
FIG. 8 is an image of an inspection system mounted to the prior art roller coaster car of FIG. 1.

In the embodiments previously described, the present invention has been embodied in an inspection vehicle 32 that is designed for the track 12 and rails 16 of a particular roller coaster. However, all roller coasters already have vehicles that are designed to run on their tracks. These vehicles are the roller coaster cars that are built to ride on the roller coaster. Referring to FIG. 8, an alternate embodiment of the present invention is shown wherein an inspection system 80 is mounted to an existing roller coaster car 14 and inspects the track 12 as the roller coaster car 14 runs the course of the roller coaster 10.

Depending upon the design of the roller coaster 10, free moving roller coaster cars 14 can travel in excess of one hundred miles an hour at the bottom of large drops. This means that cameras 82 mounted to the roller coaster car 14 must be able to take high definition, focused images of a rail and track system that is moving past the cameras 82 at over one hundred miles per hour. To achieve the needed detail in the images, high speed video cameras 82 must be utilized. In the technology of the day, a high speed video camera with an imaging rate of 1000 images per second can be commercially purchased at an economical price. A roller coaster car traveling at 100 mph is traveling at 147 feet per second. A high speed camera taking 1000 images per second would therefore take an image approximately every 1.76 inches along the track 12. This is well within the field of view for each of the cameras 82. Even if the roller coaster car 14 were traveling at 200 mph, an image can be taken every three inches along the track 12. This is well within the field of view for each camera 82. Accordingly, the entire track 12 can be imaged.

It would be impossible to inspect the images from the high speed cameras 82 in real time. Accordingly, the images recorded by the high speed cameras 82 can be stored in an internal electronic memory and viewed in slow motion after the ride has been completed.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of visually inspecting the track of an amusement ride, wherein said track has a support framework that supports a rail and creates obstructed areas and unobstructed areas proximate said rail along said track, said method comprising:

providing a vehicle having wheels, a safety brake, an odometer unit, an electric motor, and at least one battery for powering said electric motor, wherein at least one of said wheels is a drive wheel that engages said rail and actively moves said vehicle along said rail, and wherein said odometer unit contacts said rail and measures movement of said vehicle along said rail;

providing a system controlled that electronically monitors said electric motor to determine distance traveled by said drive wheel along said rail, wherein said system controller determines said distance traveled by said drive wheel along said rail and compares said distance traveled to said movement measured by said odometer unit, wherein said safety brake is automatically activated should said distance traveled by said drive wheel along said rail fail to match said movement measured by said odometer unit.

2. The method according to claim 1, further including providing at least three cameras carried by said vehicle that are all focused on said rail from different angles.

3. The method according to claim 2, wherein said cameras continuously image 360 degrees around said rail as said vehicle rides along said track past said obstructed areas and unobstructed areas.

4. The method according to claim 3, wherein said at least three cameras produce video images of said rail as said vehicle moves along said rail.

5. The method according to claim 4, further including providing a monitoring station, remote from said vehicle, for viewing said video images.

6. The method according to claim 5, further including a transceiver on said vehicle for exchanging data with said monitoring station.

7. The method according to claim 2, further including actively moving said at least one camera to avoid said obstructed areas along said rail as said vehicle moves along said rail.

* * * * *